United States Patent
Bajko

(10) Patent No.: US 11,785,569 B2
(45) Date of Patent: Oct. 10, 2023

(54) DEVICE AND METHOD FOR ENROLLING A WIRELESS ACCESS POINT INTO A MAP WIRELESS NETWORK

(71) Applicant: MediaTek Singapore Pte. Ltd., Solaris (SG)

(72) Inventor: Gabor Bajko, San José, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 14 days.

(21) Appl. No.: 16/828,691

(22) Filed: Mar. 24, 2020

(65) Prior Publication Data

US 2020/0314789 A1 Oct. 1, 2020

Related U.S. Application Data

(60) Provisional application No. 62/824,462, filed on Mar. 27, 2019.

(51) Int. Cl.
*H04W 60/00* (2009.01)
*H04W 76/10* (2018.01)
(Continued)

(52) U.S. Cl.
CPC ........... *H04W 60/00* (2013.01); *H04W 12/04* (2013.01); *H04W 12/06* (2013.01); *H04W 48/16* (2013.01); *H04W 76/10* (2018.02)

(58) Field of Classification Search
CPC ..... H04W 84/12; H04W 12/06; H04W 24/02; H04W 48/16; H04W 12/009; H04W 12/037; H04W 12/04; H04W 12/041; H04W 12/0431; H04W 12/0433; H04W 12/0471; H04W 12/065; H04W 12/069; H04W 12/106; H04W 12/50;
(Continued)

(56) References Cited

U.S. PATENT DOCUMENTS 7,480,500 B1 * 1/2009 Mittal ................... H04L 67/147
455/403
11,432,138 B1 * 8/2022 Jiang ..................... H04L 9/3247
(Continued)

FOREIGN PATENT DOCUMENTS

TW 201943313 A 11/2019
WO 2017148710 A1 9/2019

*Primary Examiner* — Joseph Arevalo

(57) ABSTRACT

Embodiments of the present invention provide an apparatus and method for enrolling a wireless AP into a Multi-AP (MAP) wireless network. By enrolling multiple wireless AP in a MAP wireless network, the wireless APs can cooperate to efficiently service wireless STAs and advantageously mitigate signal interference and degradation do to walls, structures, objects, etc. To enroll a new wireless AP into an existing MAP wireless network, the new wireless AP is authenticated and configured into the MAP network using a wireless device with 'controller' functionality (a "controller device") that can act as a 'Device Provisioning Protocol (DPP) configurator.' A DPP-capable smartphone can perform DPP authentication and configuration without using a proprietary smartphone application. In this way the burden on both the user and the equipment manufacturer is reduced because a propriety smartphone application is not needed to enroll the new wireless AP.

19 Claims, 5 Drawing Sheets

(51) Int. Cl.
*H04W 12/04* (2021.01)
*H04W 12/06* (2021.01)
*H04W 48/16* (2009.01)

(58) Field of Classification Search
CPC ..... H04W 60/00; H04W 76/10; H04W 76/15; H04W 88/06; H04W 88/08
USPC ............. 455/434, 558, 411, 557, 236, 422.1, 455/562.1, 67.11, 77, 92, 456.1, 450, 420, 455/41.2, 41.1
See application file for complete search history.

(56) References Cited

U.S. PATENT DOCUMENTS

| | | | |
|---|---|---|---|
| 2008/0140767 A1* | 6/2008 | Rao | H04L 67/00 709/203 |
| 2008/0317241 A1* | 12/2008 | Wang | H04M 9/082 379/406.11 |
| 2009/0016333 A1* | 1/2009 | Wang | H04L 65/80 370/389 |
| 2017/0257819 A1 | 9/2017 | McCann et al. | |
| 2017/0272963 A1* | 9/2017 | Rengarajan | H04W 24/02 |
| 2018/0109418 A1 | 4/2018 | Cammarota et al. | |
| 2018/0278625 A1 | 9/2018 | Cammarota et al. | |
| 2018/0316562 A1* | 11/2018 | Lepp | H04W 8/265 |
| 2018/0324607 A1* | 11/2018 | Rengarajan | H04W 24/02 |
| 2019/0306710 A1* | 10/2019 | Cammarota | G06F 9/4416 |
| 2020/0037372 A1* | 1/2020 | Rajendiran | H04W 24/08 |
| 2020/0162904 A1* | 5/2020 | Jiang | H04L 63/1475 |
| 2021/0037382 A1* | 2/2021 | Takeuchi | H04L 63/0442 |
| 2021/0067953 A1* | 3/2021 | Miyake | H04W 76/10 |
| 2021/0385778 A1* | 12/2021 | Ahn | H04W 48/08 |

* cited by examiner

DEVICE AND METHOD FOR ENROLLING A WIRELESS ACCESS POINT INTO A MAP WIRELESS NETWORK

CROSS-REFERENCE TO RELATED APPLICATIONS

This application claims the benefit of and priority to provisional patent application Ser. No. 62/824,462, with filing date Mar. 27, 2019, which is hereby incorporated by reference in its entirety.

FIELD

Embodiments of the present invention generally relate to the field of wireless communications. More specifically, embodiments of the present invention relate to systems and methods for enrolling wireless access points into an existing wireless network.

BACKGROUND

Modern electronic devices typically send and receive data with other electronic devices wirelessly using Wi-Fi, and the performance of Wi-Fi networks can be improved by using more than one wireless access point (AP). By using multiple APs in a Multi AP (MAP) wireless network, the overall efficiency and performance of the Wi-Fi network can be greatly improved, and poor network connections resulting from obstructions and interference can be avoided. Moreover, a wireless AP in a MAP wireless network can fail without disrupting the entire wireless network.

To create a MAP wireless network, multiple wireless APs need to be enrolled in the MAP wireless network. However, some approaches to enrolling APs into a MAP wireless network require the use of propriety software applications to identify the device for enrollment into the existing MAP wireless network. Therefore, what is needed is an approach to enrolling APs into a MAP wireless network that reduces the burden on the user and the equipment manufacturer so that new APs even from different vendors can easily and efficiently be enrolled into an existing MAP wireless network.

SUMMARY

Accordingly, embodiments of the present invention provide a method and device for enrolling a new wireless AP into a MAP wireless network. By enrolling multiple wireless APs in a MAP wireless network, the wireless APs can cooperate to efficiently service wireless STAs (i.e. stations, such as a mobile device but not limit to) and advantageously mitigate signal interference and degradation do to walls, structures, objects, etc. To enroll a new wireless AP into an existing MAP wireless network in accordance with embodiments of the present invention, the new wireless AP is authenticated and configured into the MAP network using a wireless device with 'controller' functionality (a "controller device") that can act as a 'Device Provisioning Protocol (DPP) configurator.' A DPP-capable smartphone can perform DPP authentication and initial DPP configuration without using a proprietary smartphone application. In this way, the burden on both the user and the equipment manufacturer is reduced because a propriety smartphone application is not needed to enroll the new wireless AP. According to some embodiments, the 1905 layer defined by the IEEE 1905.1 standard is used to specify the capabilities of firmware immediately above a network device's MAC layer. The 1905 layer can be used to seek out compatible devices on a wireless network to determine what connections are available to the devices and connected hosts, for example.

According to one described embodiment, a method of enrolling a wireless access point (AP) into an existing multi-AP (MAP) wireless network is disclosed. The method includes the new wireless AP scanning the existing MAP wireless network to identify a controller device of the existing MAP wireless network using the initial DPP configuration, and the wireless AP receiving operational parameters from the controller device to configure the wireless AP and to enroll the wireless AP into the existing MAP wireless network, where the wireless AP is authenticated using a DPP-capable smartphone performing a DPP authentication procedure, and the wireless AP is configured by the DPP-capable smartphone performing an initial DPP configuration procedure to connect the wireless AP to the existing MAP wireless network.

According to some embodiments, the final operational parameters are defined by a remote service provider.

According to some embodiments, the DPP-capable smartphone executes an Android-based operating system.

According to some embodiments, the DPP-capable smartphone performs DPP authentication and DPP configuration using a DPP stack of the Android-based operating system.

According to some embodiments, the method includes the new wireless AP connecting to an agent of the existing MAP wireless network to perform the scanning of the existing MAP wireless network.

According to some embodiments, configuring the wireless AP with final operational parameters includes at least one of performing a Pairwise Master Key (PMK) handshake between the wireless AP and the controller device and provisioning the wireless AP using a network name and credentials for the MAP wireless network.

According to some embodiments, the configuring the wireless AP with final operational parameters includes performing a 4-way handshake between the new wireless AP and the controller device to establish 1905 layer keys.

According to some embodiments, the 4-way handshake is performed using 1905 layer encapsulated messages.

According to some embodiments, performing an initial DPP configuration procedure include configuring a backhaul STA (bSTA) and 1905 layer keys to connect the wireless AP to the existing MAP wireless network, and configuring the wireless AP with operational parameters includes configuring a bBSS and a fBSS after the 1905 layer keys are configured.

According to some embodiments, the DPP authentication procedure includes a DPP authentication request, a DPP authentication response, and a DPP authentication confirmation.

According to some embodiments, the method includes scanning a QR code of the new wireless AP using the DPP-capable smartphone, where the DPP authentication procedure is performed based on the QR code.

According to some embodiments, the DPP authentication procedure is performed using at least one of: Near-field communication (NFC); Bluetooth; and Bluetooth Low Energy (BLE).

According to another embodiment, a method of enrolling a wireless access point (AP) into a Multi-AP (MAP) wireless network is disclosed. The method includes using a controller device of the MAP wireless network to perform a 4-way handshake with the wireless AP to establish 1905 layer integrity and encryption keys for communicating over the MAP wireless network, receiving a configuration request at the controller device of the MAP wireless network from the wireless AP, and using the controller device to configure the wireless AP with operational parameters to enroll the wireless AP into the MAP wireless network in response to the configuration request. The wireless AP is authenticated using a DPP-capable smartphone performing a DPP authentication procedure, and the wireless AP is initially configured using the DPP-capable smartphone performing an initial DPP configuration procedure to connect the wireless AP to the MAP wireless network.

According to a different embodiment, a non-transitory computer-readable storage medium is disclosed having embedded therein program instructions, which when executed by one or more processors of a device, causes the device to execute a method for enrolling a wireless access point (AP) into a Multi-AP (MAP) wireless network. The method includes using a controller device of the existing MAP wireless network to perform a 4-way handshake with the wireless AP to establish 1905 layer integrity and encryption keys for communicating over the MAP wireless network, receiving a configuration request at the controller device of the MAP wireless network from the wireless AP, and using the controller device to configure the wireless AP with operational parameters to enroll the wireless AP into the MAP wireless network in response to the configuration request. The wireless AP is authenticated using a DPP-capable smartphone performing a DPP authentication procedure, and the wireless AP is initially configured using the DPP-capable smartphone performing an initial DPP configuration procedure to connect the wireless AP to the MAP wireless network.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
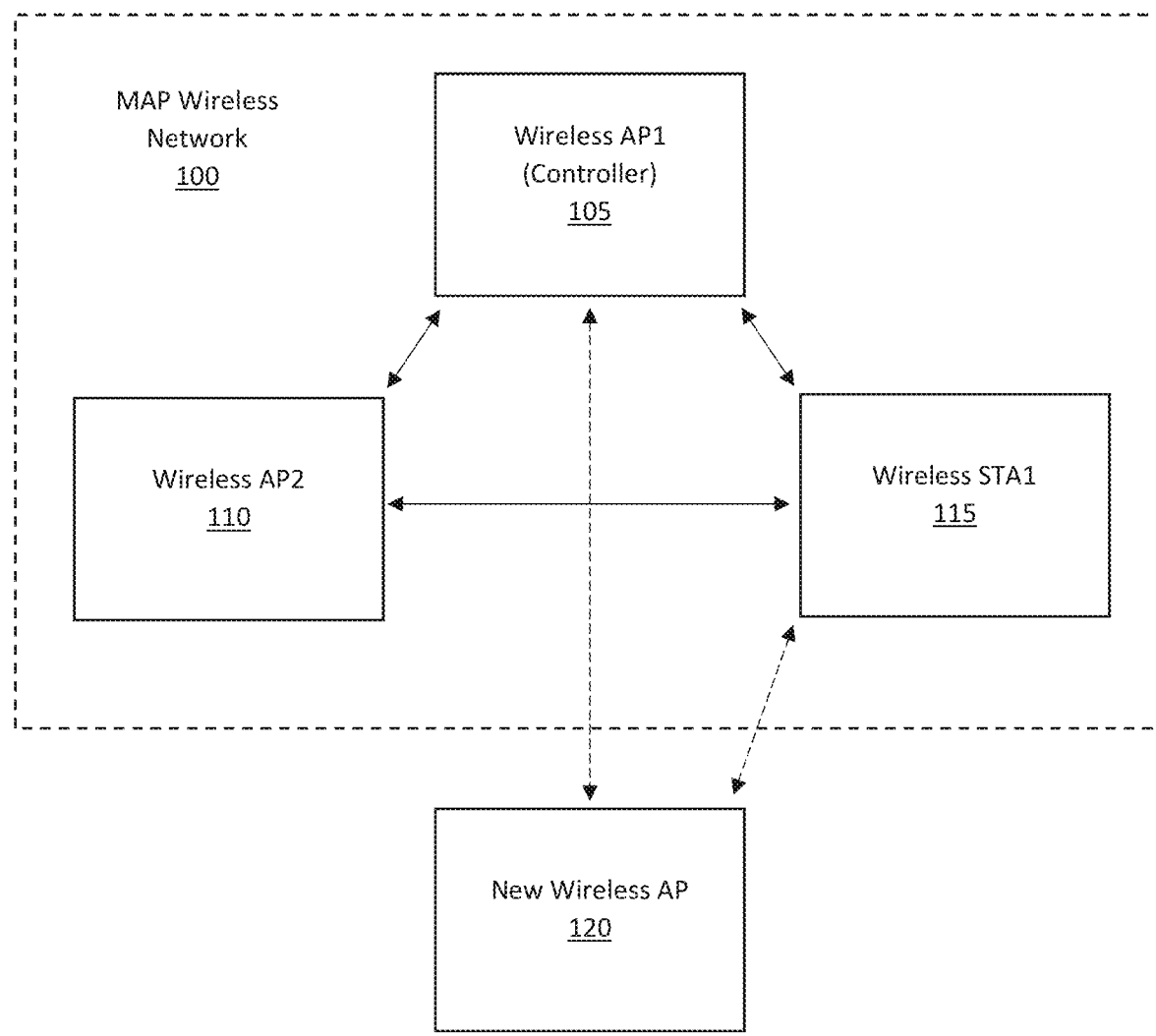
FIG. 1 is a block diagram of an exemplary Multi-AP (MAP) wireless network with multiple wireless access points according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 2, 3A, and 3B) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "authenticating," "identifying," "enrolling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Novel AP Enrollment Process for Map Wireless Networks

As used herein, the term "EHT" may refer to a recent generation of wireless communication (Wi-Fi) known as Extremely High Throughput (EHT) and is defined according to the IEEE 802.11be standards. The term station (STA) refers to an electronic device capable of sending and receiving data over Wi-Fi that is not operating as an access point (AP).

Embodiments of the present invention provide an apparatus and method for enrolling a wireless AP into a Multi-AP (MAP) wireless network. By enrolling multiple wireless AP in a MAP wireless network, the wireless APs can cooperate to efficiently service wireless STAs and advantageously mitigate signal interference and degradation caused by signal obstructions such as walls, structures, objects, etc. To enroll a new wireless AP into an existing MAP wireless network, the new wireless AP must be authenticated and configured into the MAP network using a wireless device with 'controller' functionality (a "controller device") that can act as a 'Device Provisioning Protocol (DPP) configurator.'

According to one exemplary approach, a smartphone can scan a QR code printed on or displayed on the new wireless AP, and deliver the QR code to a controller/DPP configurator device of the existing MAP network. However, this approach disadvantageously requires a proprietary application to be created and provided to the user by the vendor of the existing wireless AP, and the application is usually manually downloaded and installed on a smartphone by the user. The controller/DPP configurator device then is able to perform DPP authentication and DPP configuration procedures for enrolling the new wireless AP into the existing MAP wireless network according to the QR code provided by the smartphone application.

According to another exemplary approach for enrolling a new wireless AP into an existing wireless network according to embodiments of the present invention, a DPP-capable smartphone is used to perform DPP authentication and configuration without using a proprietary smartphone application. In this way, the burden on both the user and the equipment manufacturer is reduced because a propriety smartphone application is not needed to enroll the new wireless AP. According to some embodiments, authentication is advantageously performed by the smartphone using a DPP protocol stack of the Android mobile operating system, for instance. Moreover, the configuration can be performed by existing equipment of a MAP wireless network which may be configured using the cloud or a remote service provider. In this way, the authentication and operational configuration can be determined by two separate entities.

With regard to FIG. 1, an exemplary existing MAP wireless network 100 is depicted according to embodiments of the present invention. The MAP wireless network 100 includes wireless AP1 105 in wireless communication with wireless AP2 110. Wireless STA1 115 (e.g., a smartphone) is enrolled in the MAP wireless network 100 and can be serviced by both wireless AP1 105 and wireless AP2 110. The wireless AP1 105 is configured to act as a controller device for enrolling new devices into the MAP Wireless Network 100. Specifically, the wireless AP1 105 authenticates and configures new devices into MAP Wireless Network 100 using DPP configuration and authentication procedures according to a QR code displayed on or printed on the new wireless device (e.g., new wireless AP 120).

Figure 3A:
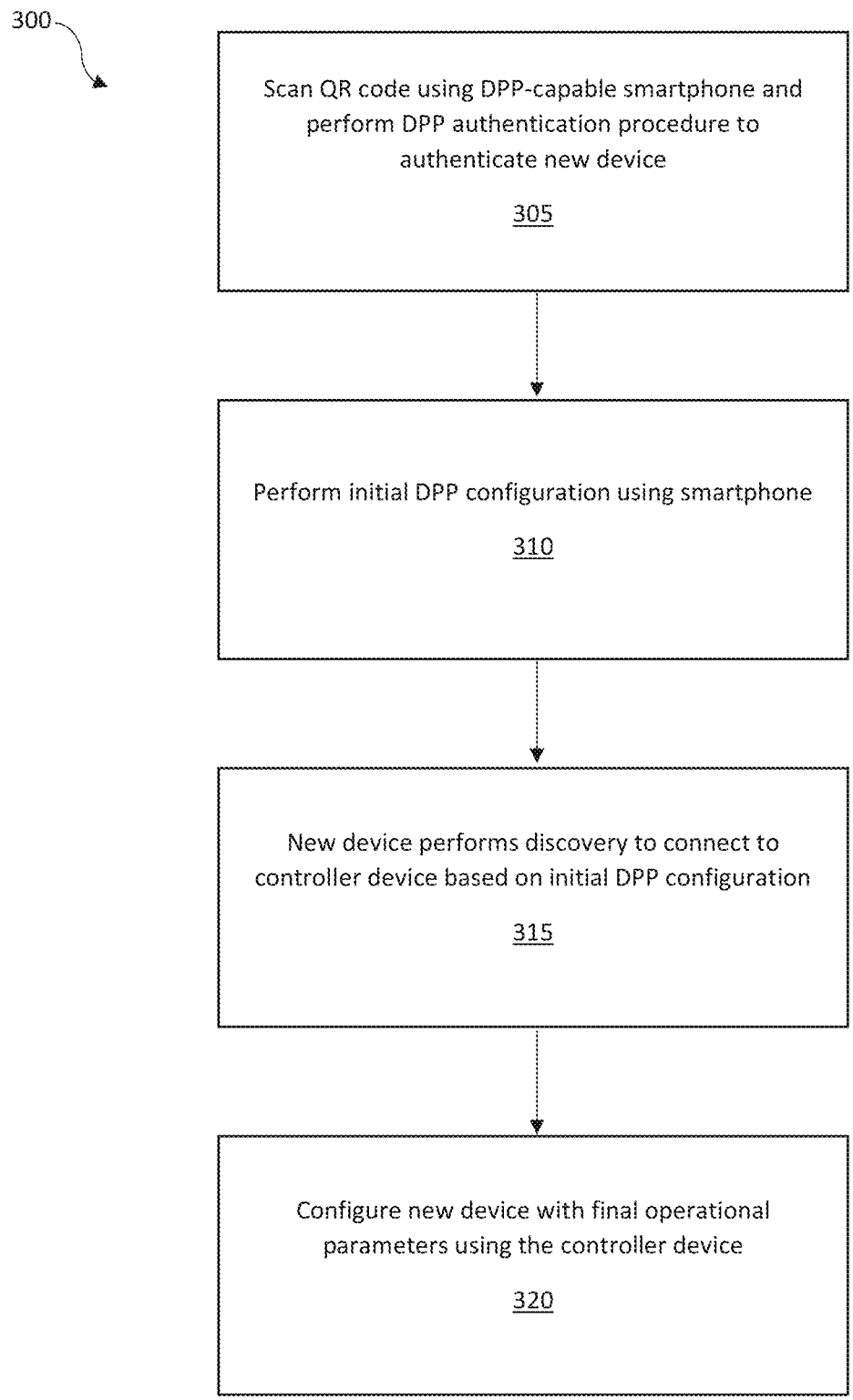
FIG. 3A is a flow chart of an exemplary sequence of computer implemented steps for enrolling a new wireless access point into an existing wireless network using a Device Provisioning Protocol (DPP) capable smartphone according to embodiments of the present invention.
Figure 3B:
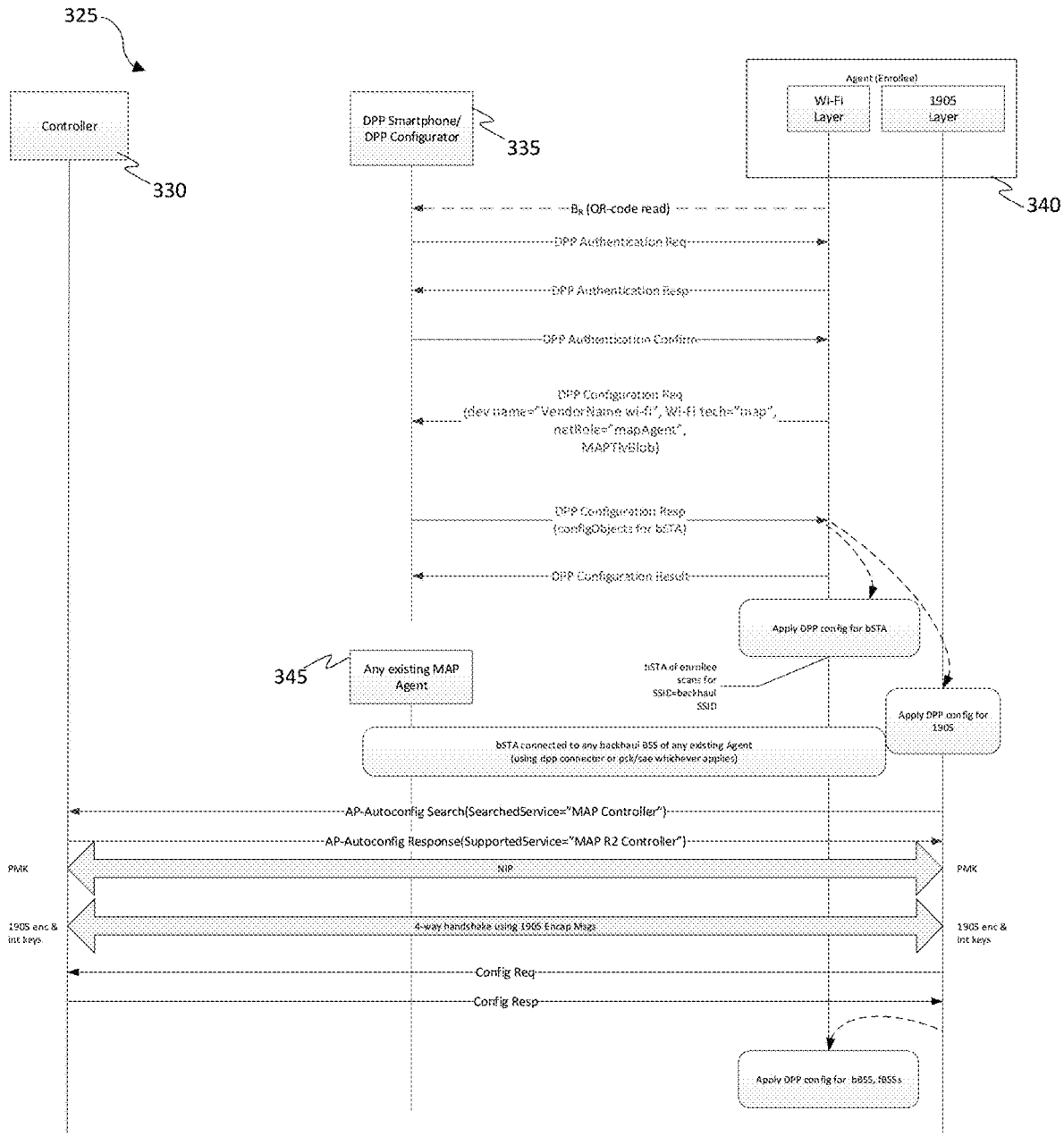
FIG. 3B is a flow chart and transmission timing diagram of an exemplary sequence of computer implemented steps for enrolling a new wireless access point into an existing wireless network using a Device Provisioning Protocol (DPP) capable smartphone according to embodiments of the present invention.

Accordingly, the wireless STA1 115 scans the QR code of the new wireless AP 120 and delivers the QR code (or information associated with the QR code, such as the identity of the new wireless AP 120) to a controller/DPP configurator device (e.g., wireless AP1 105) of the existing MAP network by executing a proprietary smartphone application. By enrolling multiple wireless AP in a MAP wireless network, the wireless APs can cooperate to efficiently service wireless STAs and advantageously mitigate signal interference and degradation do to walls, structures, objects, etc. However, it can be quite burdensome for the equipment manufacturer of the new wireless AP to develop and provide an application for enrolling the new wireless AP into a MAP network, and the user may be frustrated by the cumbersome process of downloading and installing applications each time a new device is to be enrolled. Therefore, as depicted in FIGS. 3A and 3B, some embodiments of the present invention offer an alternative solution using a DPP capable smartphone as a configurator instead of an existing controller device. In this approach, no proprietary smartphone application is necessary, and the burden on the user and equipment manufacturer is significantly reduced.

Figure 2:
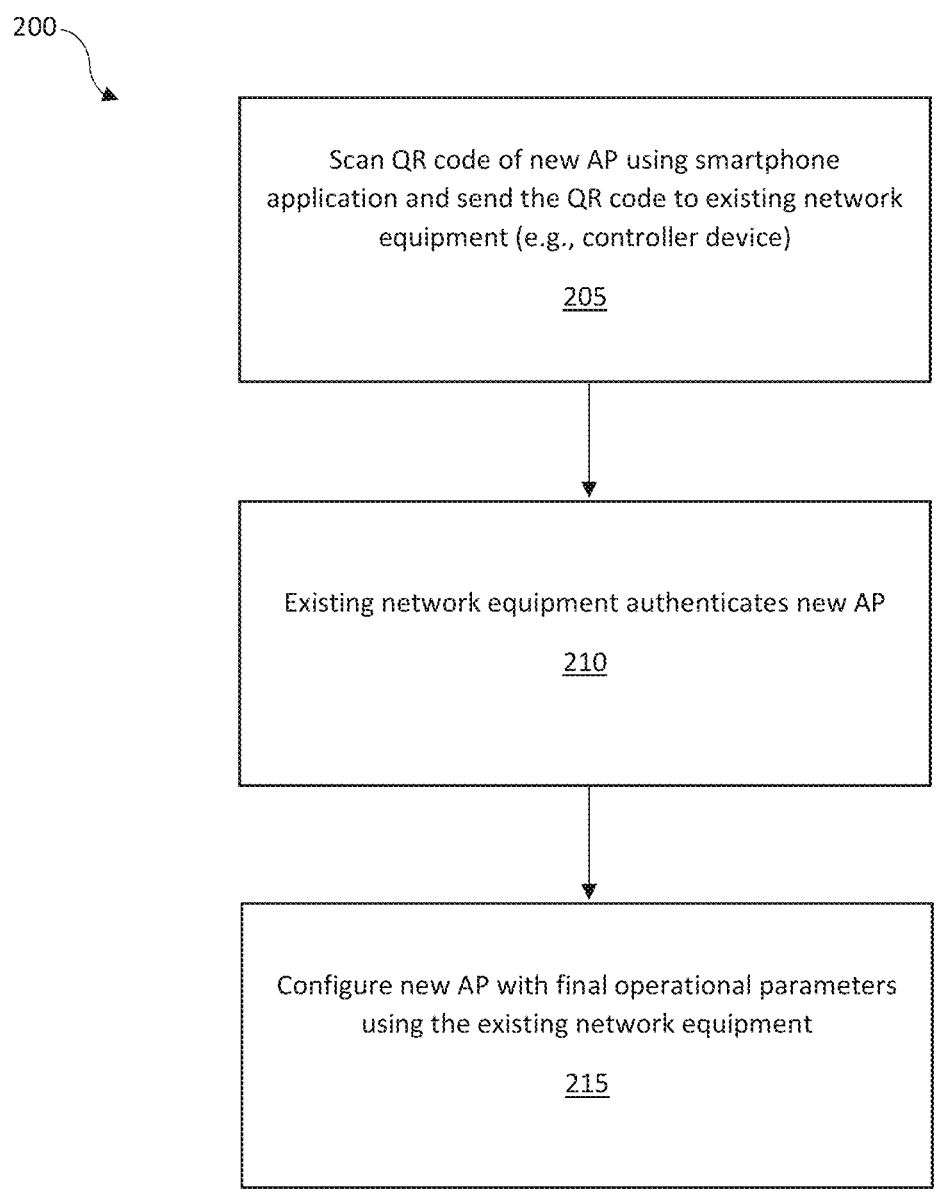
FIG. 2 is a flow chart of an exemplary sequence of computer implemented steps for enrolling a new wireless access point into an existing MAP wireless network using a smartphone application to scan a QR code.

FIG. 2 is a flow chart of an exemplary sequence of computer implemented steps 200 for enrolling a new wireless access point into an existing MAP wireless network using a smartphone application to scan a QR code according to embodiments of the present invention.

At step 205, a smartphone enrolled in the existing MAP wireless network executes a proprietary smartphone application to scan a QR code printed on or associated with the new wireless access point. The QR code can be displayed if the device has a display screen. The QR code and/or information associated with the QR code is sent to a controller device of the existing MAP wireless network. According to some embodiments the information associated with the new wireless access point is transmitted to a controller device of the existing MAP wireless network using Near-field Communication (NFC), Bluetooth, or Bluetooth Low Energy (BLE), or similar wireless communication protocols.

At step 210, existing network equipment (e.g., the controller device) authenticates the new device according to the QR code information provided by the smartphone. For example, a controller device of the existing wireless network can perform a DPP authentication procedure to authenticate the new device for the existing MAP wireless network.

At step 215, the existing network equipment (e.g., the controller device) configures the new device using final operational parameters over the existing MAP wireless network. For example, a controller device of the existing wireless network can perform a DPP configuration procedure to configure the new device for the existing MAP wireless network. The new wireless AP is then within the wireless network. According to some embodiments, step 215 includes provisioning the wireless AP using a network name and credential for communicating over the MAP network With regard to FIG. 3A, a flow chart of an exemplary sequence of computer implemented steps 300 for enrolling a new wireless access point into an existing wireless network using a Device Provisioning Protocol (DPP) capable smartphone is depicted according to embodiments of the present invention. Process 300 advantageously does not use a proprietary smartphone application thereby reducing the development burden on the equipment manufacture and providing a simplified setup procedure so that the user can easily and efficiently enroll a new AP into an existing MAP wireless network.

At step 305, a new device (e.g, a new wireless AP) is authenticated for enrollment into an existing MAP wireless network. Step 305 includes a DPP-capable smartphone scanning a QR code printed on or otherwise associated with or displayed on the new wireless AP to authenticate the new device using a DPP authentication procedure.

At step 310, the DPP-capable smartphone performs an initial DPP configuration to configure the backhaul STA (bSTA) interface of the new wireless AP using a Service Set Identifier (SSID), passcode, and AKM (Authentication and Key Management) suite for accessing the existing MAP wireless network according to the QR code. A bSTA is an AP which acts as a client to connect to an upstream AP.

At step 315, the new wireless AP performs a network scanning/discovery procedure to identify a controller device on the existing MAP wireless network using the initial DPP configuration. New AP runs the Network Introduction protocol from the DPP specification to establish Pairwise Master Key (PMK) with the controller. The new wireless AP then initiates a 4-way handshake to establish 1905 layer integrity and encryption keys.

At step 320, the new wireless AP requests configuration information from the controller for configuring the Backhaul Basic Service Set (bBSS) and Fronthaul Basic Service Set (fBSS) radios of the new wireless AP, and the new wireless AP configures the bBSS and fBSS radios accordingly to finalize configuration and enrolment in the existing MAP wireless network. The bBSS may not be visible to client devices of the existing MAP wireless network as it is used to interconnect and manage the APs of the MAP network. The fBSS is visible to the client devices and is used to connect to and communicate over the MAP wireless network.

With regard to FIG. 3B, an exemplary flow chart and transmission timing diagram 325 for enrolling a new wireless access point into an existing wireless network using a Device Provisioning Protocol (DPP) capable smartphone is depicted according to embodiments of the present invention. The approach depicted in FIG. 3B advantageously does not use a proprietary smartphone application thereby reducing the development burden on the equipment manufacture and providing a simplified setup procedure so that the user can easily and efficiently enroll a new AP into an existing MAP wireless network.

The exemplary flow chart and transmission timing diagram 325 depicted in FIG. 3B is performed between a controller device 330 of the existing MAP wireless network, a DPP-capable smartphone 335, and a new wireless device (an enrollee) 340 to be enrolled into the existing MAP wireless network.

The new wireless device 340 is authenticated using the following exemplary authentication procedure:
1. The DPP-capable smartphone 335 reads a QR code printed on, displayed on, or otherwise associated with new wireless device 340.
2. A DPP Authentication Request is sent from the DPP-capable smartphone 335 to the new wireless device 340 requesting DPP authentication for enrollment into the existing MAP wireless network.
3. A DPP Authentication Response is sent from the new wireless device 340 to the DPP-capable smartphone 335 for performing DPP authentication.
4. A DPP Authentication Confirmation is sent from the DPP-capable smartphone 335 to the new wireless device 340 to confirm that DPP authentication is successful.

After the DPP-authentication procedure is performed, an initial DPP-configuration procedure is performed so that the new wireless device 340 can connect to the existing MAP wireless network as follows:
1. The new wireless device 340 sends a DPP configuration request to the DPP-capable smartphone 335. The DPP configuration request can include a developer/vendor name associated with the new wireless device 340, a wifi-tech type set to 'MAP", and a network role set to 'mapAgent.'
2. The DPP-capable smartphone 335 responds to the DPP configuration request with a DPP configuration response that includes a configuration object for configuring the bSTA. The DPP configuration response is used by the new wireless device 340 to configure the bSTA and to configure a 1905 layer connector of the new wireless device 340. The 1905 layer defined by the IEEE 1905.1 standard is used to specify the capabilities of firmware immediately above a network device's MAC layer. The 1905 layer can be used to seek out compatible devices on a wireless network to determine what connections are available to the devices and connected hosts, for example.
3. The new wireless device 340 responds to the DPP configuration response with a DPP configuration result.

After the initial DPP-configuration procedure is performed, and the DPP configuration is applied to the bSTA and 1905 layer connector of the new wireless device 340, the new wireless device 340 scans the existing MAP wireless network to identify a controller device 330 of the existing MAP wireless network.

In one example, the new wireless device 340 can use a bSTA connected to any backhaul BSS of any existing map agent 345 and perform an AP-Autoconfig Search for a device identified as a 'MAP Controller.' A PMK procedure/ handshake is performed between the new wireless device 340 and the controller device 330. The new wireless device 340 then initiates a 4-way handshake with the controller device 330 to establish 1905 layer integrity and encryption session keys for communicating over the existing MAP wireless network, for example, using 1905 layer encapsulated messages. The new wireless device requests configuration information from the controller device 330 for configuring the bBSS and fBSS radios of the new wireless device 340, and the new wireless device 340 configures the bBSS and fBSS radios according to the configuration information received from the controller device 330 to finalize configuration and enrolment in the existing MAP wireless network.

According to some embodiments, configuring the bBSS and fBSS radios of the new wireless device 340 is a separate processes from the initial configuration. For example, the bSTA and 1905 layer can be configured initially, and the bBSS and fBSS can be configured after the 1905 layer keys are established, either as a follow up procedure or as a separate process.

Exemplary Computer Controlled System

Embodiments of the present invention are drawn to electronic systems for enrolling wireless APs into a MAP network. The following discussion describes one such exemplary electronic system or computer system that can be used as a platform for implementing embodiments of the present invention. The exemplary computer system 412 can be a wireless AP, a wireless STA, a controller device, or a smartphone, for example.

Figure 4:
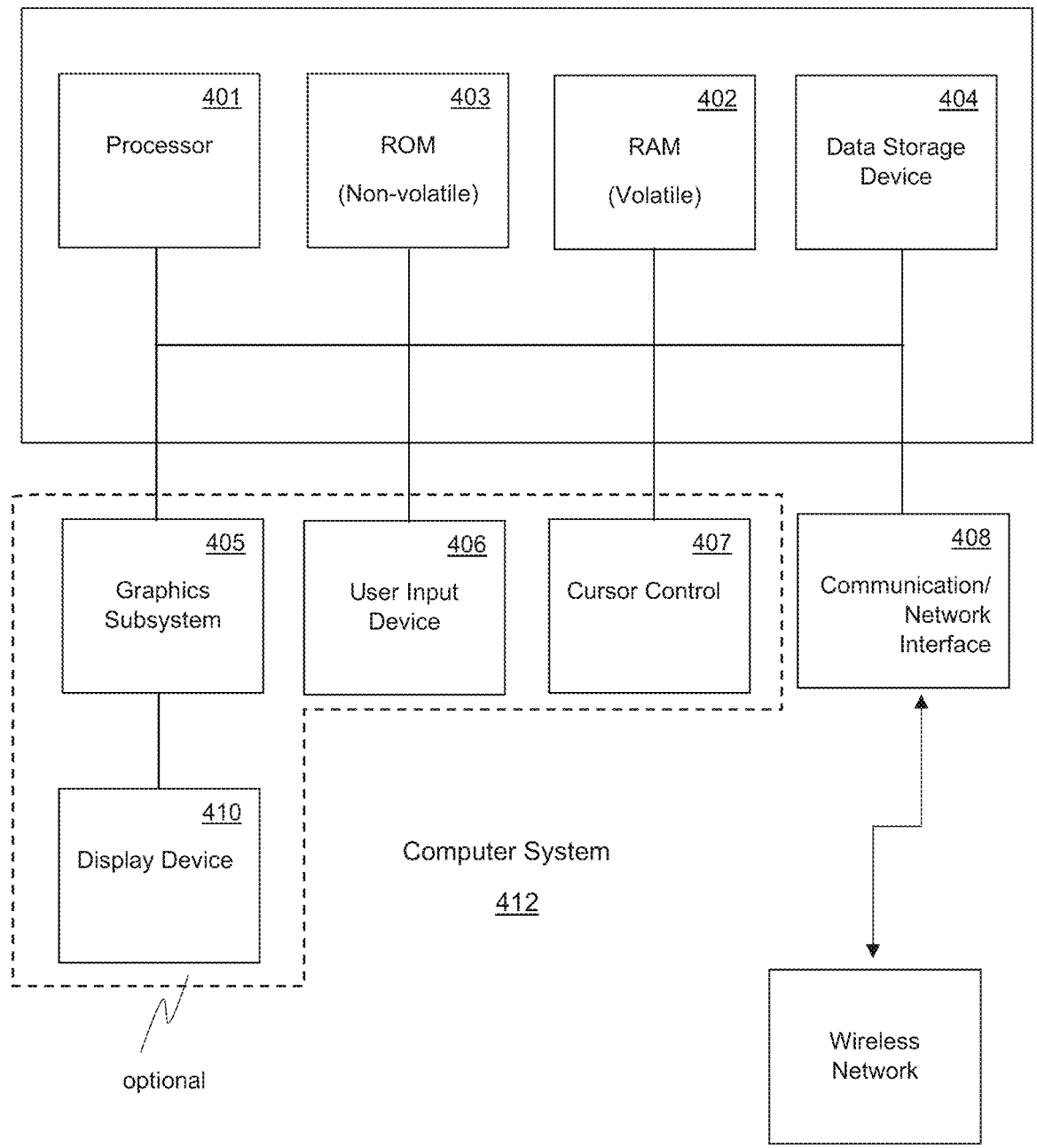
FIG. 4 is a block diagram depicting an exemplary computer system platform upon which embodiments of the present invention may be implemented.

In the example of FIG. 4, the exemplary computer system or wireless device includes a central processing unit (such as a processor or a CPU) 401 for running software applications and optionally an operating system. Random access memory 402 and read-only memory 403 store applications and data for use by the CPU 401. Data storage device 404 provides non-volatile storage for applications and data and may include fixed disk drives, removable disk drives, flash memory devices, and CD-ROM, DVD-ROM or other optical storage devices. The optional user inputs 406 and 407 comprise devices that communicate inputs from one or more users to the computer system 412 (e.g., mice, joysticks, cameras, touch screens, and/or microphones).

A communication or network interface 408 includes a plurality of transceivers and allows the computer system 412 to communicate with other computer systems, networks, or devices via an electronic communications network, including wired and/or wireless communication and including an Intranet or the Internet (e.g., 802.11 wireless standard). According to embodiments of the present invention, the communication or network interface 408 can operate multiple transceivers simultaneously e.g., Transceiver 1 and Transceiver 2. The communication or network interface 408 can further include a cooperative management unit for coordinating the data sent and/or received by the transceivers. The communication or network interface 408 and can include a dual band interface that can operate in multiple bands simultaneously, such as 2.4 GHz, 5 GHz, and/or 6 GHz. Various back-off procedures can be performed by the computer system 412 to synchronize simultaneous communication over the multiple transceivers.

The optional display device 410 may be any device capable of displaying visual information in response to a signal from the computer system 412 and may include a flat panel touch sensitive display, for example, and may be remotely disposed. Display 410 can be used to display a QR code, as described above. The components of the computer system 412, including the CPU 401, memory 402/403, data storage 404, user input devices 406, and graphics subsystem 405 may be coupled via one or more data buses.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of enrolling a new wireless access point (AP) into an existing Multi-AP (MAP) wireless network, the method comprising:
scanning the existing MAP wireless network to identify a controller device of the existing MAP wireless network based on an initial device provisioning protocol (DPP) configuration, wherein the DPP configuration is used to authenticate and configure a new wireless AP using the controller device; and
receiving operational parameters from the controller device to configure the new wireless AP and to enroll the new wireless AP into the existing MAP wireless network using DPP, wherein the new wireless AP is not initially connected to the existing MAP wireless network,
wherein the new wireless AP is authenticated using the DPP-capable smartphone performing a DPP authentication procedure, and
wherein the new wireless AP is configured by the DPP-capable smartphone performing an initial DPP configuration procedure to connect the new wireless AP to the existing MAP wireless network.

2. The method as described in claim 1, wherein the operational parameters are defined by a remote service provider.

3. The method as described in claim 1, wherein an Android-compatible operating system is executed by the DPP-capable smartphone.

4. The method as described in claim 3, wherein a DPP stack of the Android-compatible operating system is executed by the DPP-capable smartphone to perform the DPP authentication procedure and the DPP configuration procedure.

5. The method as described in claim 1, further comprising the new wireless AP connecting to an agent of the existing MAP wireless network to perform the scanning of the existing MAP wireless network.

6. The method as described in claim 1, wherein the new wireless AP is configured with operational parameters using at least one of:
a Pairwise Master Key (PMK) handshake between the new wireless AP and the controller device; and
a provisioning of the new wireless AP using a network name and credentials for the MAP wireless network.

7. The method as described in claim 1, further comprising performing a 4-way handshake between the new wireless AP and the controller device to establish 1905 layer keys, and wherein the performing a 4-way handshake is performed using 1905 layer encapsulated messages.

8. A method described in claim 1, wherein performing an initial DPP configuration procedure comprises configuring a backhaul STA (bSTA) interface and 1905 layer keys to connect the new wireless AP to the existing MAP wireless network, and wherein configuring the new wireless AP with operational parameters comprises configuring a Backhaul Basic Service Set (bBSS) radio and a Fronthaul Basic Service Set (fBSS) radio of the new wireless AP after the 1905 layer keys are configured.

9. The method as described in claim 1, further comprising scanning a QR code of the new wireless AP using the DPP-capable smartphone, wherein the DPP authentication procedure is performed based on the QR code.

10. A method of enrolling a new wireless access point (AP) into a Multi-AP (MAP) wireless network, the method comprising:
using a controller device of the MAP wireless network to perform a 4-way handshake with the wireless new AP to establish 1905 layer integrity and encryption keys for communicating over the MAP wireless network, wherein a new wireless AP is not initially connected to the MAP wireless network;
receiving a configuration request at the controller device of the MAP wireless network from the new wireless AP; and
using the controller device to configure the new wireless AP with operational parameters to enroll the new wireless AP into the MAP wireless network in response to the configuration request,
wherein the new wireless AP is authenticated using a DPP-capable smartphone performing a device provisioning protocol (DPP) authentication procedure, and
wherein the new wireless AP is initially configured using the DPP-capable smartphone performing an initial DPP configuration procedure to connect the new wireless AP to the MAP wireless network.

11. The method as described in claim 10, wherein the operational parameters are defined by a remote service provider.

12. The method as described in claim 10, wherein the DPP-capable smartphone executes an Android-compatible operating system.

13. The method as described in claim 12, wherein the DPP-capable smartphone performs DPP authentication and DPP configuration using a DPP stack of the Android-compatible operating system.

14. The method as described in claim 10, further comprising the controller device performing a Pairwise Master Key (PMK) handshake with the new wireless AP.

15. The method as described in claim 10, wherein the controller device configures Backhaul Basic Service Set (bBSS) and Fronthaul Basic Service Set (fBSS) radios of the new wireless AP.

16. The method as described in claim 10, wherein the 4-way handshake is performed using 1905 layer encapsulated messages.

17. The method as described in claim 10, wherein the DPP authentication procedure comprises a DPP authentication request, a DPP authentication response, and a DPP authentication confirmation.

18. The method as described in claim 10, wherein the DPP authentication procedure is performed using at least one of: Near-field communication (NFC); Bluetooth; and Bluetooth Low Energy (BLE).

19. A non-transitory computer-readable storage medium having embedded therein program instructions, which when executed by one or more processors of a device, causes the device to execute a method for enrolling a new wireless access point (AP) into a Multi-AP (MAP) wireless network, the method comprising:

using a controller device of the existing MAP wireless network to perform a 4-way handshake with the new wireless AP to establish 1905 layer integrity and encryption keys for communicating over the MAP wireless network, wherein a new wireless AP is not initially connected to the MAP wireless network, and;

receiving a configuration request at the controller device of the MAP wireless network from the new wireless AP; and using the controller device to configure the new wireless AP with operational parameters to enroll the new wireless AP into the MAP wireless network in response to the configuration request, wherein the new wireless AP is authenticated using a DPP-capable smartphone performing a device provisioning protocol (DPP) authentication procedure, and wherein the new wireless AP is initially configured using the DPP-capable smartphone performing an initial DPP configuration procedure to connect the new wireless AP to the MAP wireless network.

\* \* \* \* \*